United States Patent [19]

Goodwin

[11] 4,264,955
[45] Apr. 28, 1981

[54] SIGNAL VOTER

[75] Inventor: Roy L. Goodwin, Chatsworth, Calif.

[73] Assignee: The United States of America as represented by the United States Department of Energy, Washington, D.C.

[21] Appl. No.: 957,633

[22] Filed: Nov. 3, 1978

[51] Int. Cl.³ .......................... H03K 5/20; G06G 7/12
[52] U.S. Cl. ................................... 364/510; 328/147; 307/464
[58] Field of Search .................. 364/510, 483, 811; 328/147, 154; 307/219, 204, 235

[56] References Cited

U.S. PATENT DOCUMENTS

| | | | |
|---|---|---|---|
| 3,305,735 | 2/1967 | Moreines | 307/88.5 |
| 3,412,261 | 11/1968 | Hickin et al. | 307/219 |
| 3,467,956 | 9/1969 | Moreines | 307/211 X |
| 3,544,778 | 12/1970 | Masters, Jr. | 307/204 X |
| 3,610,950 | 10/1971 | Keller et al. | 307/204 |
| 3,631,352 | 12/1971 | Kelley et al. | 328/147 X |
| 3,689,802 | 9/1972 | Waldmann | 307/204 X |
| 3,714,465 | 1/1973 | Skrenes | 307/235 R |
| 3,863,056 | 1/1975 | Klein | 328/147 X |
| 3,872,389 | 3/1975 | Willard | 328/147 X |
| 3,979,720 | 9/1976 | Laas et al. | 328/147 X |
| 4,001,605 | 1/1977 | Thomas et al. | 328/147 X |

Primary Examiner—Edward J. Wise
Attorney, Agent, or Firm—Clifton E. Clouse, Jr.; Roger S. Gaither; James E. Denny

[57] ABSTRACT

A voter for providing a single accurate output signal that is derived from the closest two signal levels of three input signals, each of which signals represents a measurement of the same phenomena. By means of the voting circuit, the signals are first sorted by level of amplitude and then ranked as highest, middle or lowest. The highest or lowest signal that is furthest from the middle signal is rejected, while the other highest or lowest signal is selected for processing. The selected high or low signal is then averaged with the middle signal to provide the output signal.

12 Claims, 3 Drawing Figures

SIGNAL VOTER

BACKGROUND OF THE INVENTION

The invention disclosed herein was made under, or in, the course of U.S. Department of Energy Contract no. EY-76-C-03-1108.

The present invention relates to voting circuits, and more particularly it relates to a circuit in which the signal level that is most deviant from the middle signal level is rejected and the closest signal levels are averaged to provide an accurate output signal.

It is desirable in some control systems to select and average the most nearly equal of several signals to derive an output signal. For example, in the steam outlet manifold for each panel of the central receiver of a solar thermal power system, it is necessary to sense the steam temperature in the steam outlet manifold. For successful and safe operation of such a system, it is required that the temperature sensing scheme be fail-operative and that the effect of any signal distortion, such as might be acquired during transmission, be minimized. Preferably, this is accomplished by a means that is simple, effective, accurate, reliable, economic and appropriate to achieve the results desired.

SUMMARY OF THE INVENTION

In brief, the present invention relates to a signal voter for providing an output signal that is derived from a plurality of input signals whereby the signals are ranked by amplitude from high to low, the high or low signal that is furthest from the median signal is rejected, and the remaining signals are averaged to provide the output signal.

It is an object of the invention to provide improved signal voting that is simple, effective, accurate, reliable and economic.

Another object is to derive from a plurality of input signals an output signal that is a function solely of the two input signals having the most nearly equal amplitudes.

Another object is to perform signal voting that is suitable in general for a variety of control or measurement systems involving such parameters as temperature, pressure, flow, and strain.

Another object is to provide signal voting that is appropriate for use in the temperature control system of a steam panel in the central receiver of a solar thermal power station.

Another object is to provide signal voting of continuously varying analog signals where triple redundancy is required assuming single point failure only.

Other objects and advantageous features of the invention will be apparent in a description of a specific embodiment thereof, given by way of example only, to enable one skilled in the art to readily practice the invention which is described hereinafter with reference to the accompanying drawing.

DETAILED DESCRIPTION OF THE INVENTION

Reference will now be made in detail to the present preferred embodiment of the invention, an example of which is illustrated in the accompanying drawing.

While the invention will be described in connection with a preferred embodiment, it will be understood that it is not intended to limit the invention to that embodiment. On the contrary, it is intended to cover all alternatives, modifications and equivalents as may be included within the spirit and scope of the invention defined by the appended claims.

Figure 1:
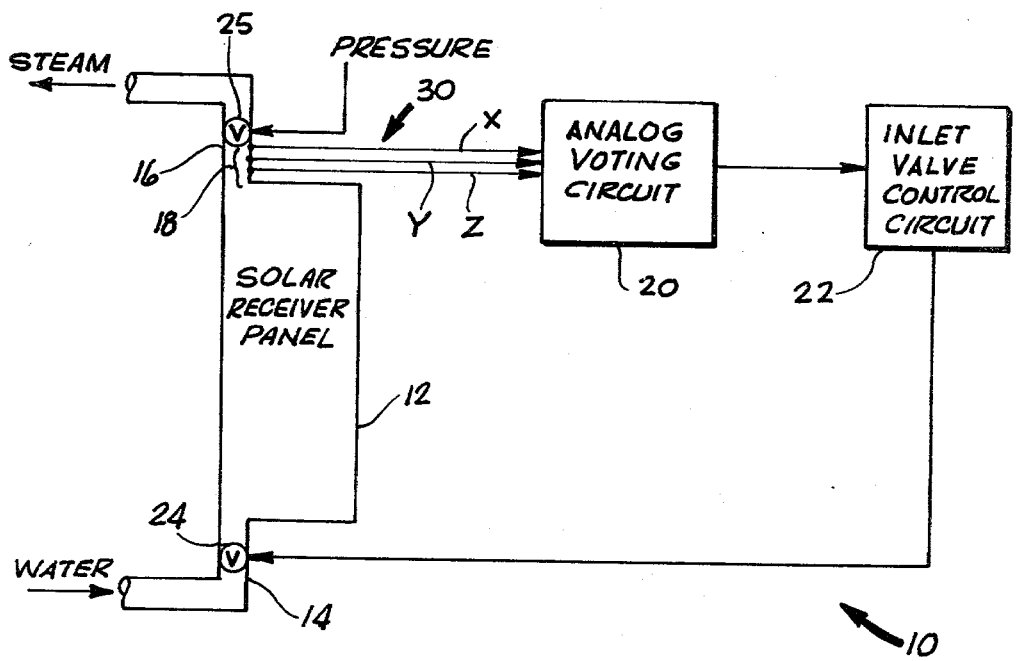
FIG. 1 is a block diagram of a system for sensing and controlling the temperature in a solar receiver panel, according to the invention.

Referring to the drawing, there is shown in FIG. 1 a system 10 for controlling the temperature, pressure and supply of working fluid in a solar receiver panel 12 so as to supply the working fluid at a useful temperature and pressure to an electric power generating system. The panel 12 includes a water inlet manifold 14 and a steam outlet manifold 16. Three temperature sensors 18, such as thermocouples, are mounted in the steam outlet manifold for providing three separate analog input signals to a voter such as voting circuit 20 in which a single output signal is derived from the two input signals having the closest signal levels. The output signal is applied to a control circuit 22 for controlling the opening and closing of a valve 24 in the water inlet manifold 14 and thereby controlling the flow of water into the panel 12. A valve 25 in the steam outlet manifold is responsive to pressure requirements of the system to control the steam flow through the manifold.

In a power generating station utilizing a central receiver tower, a plurality of panels 12, each with sensors 18, are located at the top of the tower. The sensors 18 therefore are located in a remote area of the plant that is humanly inaccessible in a practical sense during operation of the plant due to high temperatures at the location. Since it is highly undesirable to shut down a power generating plant during normal operating periods, the correct flow of working fluid to each panel is critical to continuing successful and safe operation of the plant. It is necessary, therefore, that the temperature in the steam outlet manifold be sensed at all times during normal operation of the plant; and three sensors 18 are provided, each with a separate line to the voting circuit 20 which requires only two of the three input signals to develop an output signal. Thus, failure of one of the sensors or failure of a connecting line to the circuit 20 will not disrupt operation of the power generating plant. Use of such a system also minimizes the effect of any signal distortion such as might be imposed during signal transmission.

Figure 2:
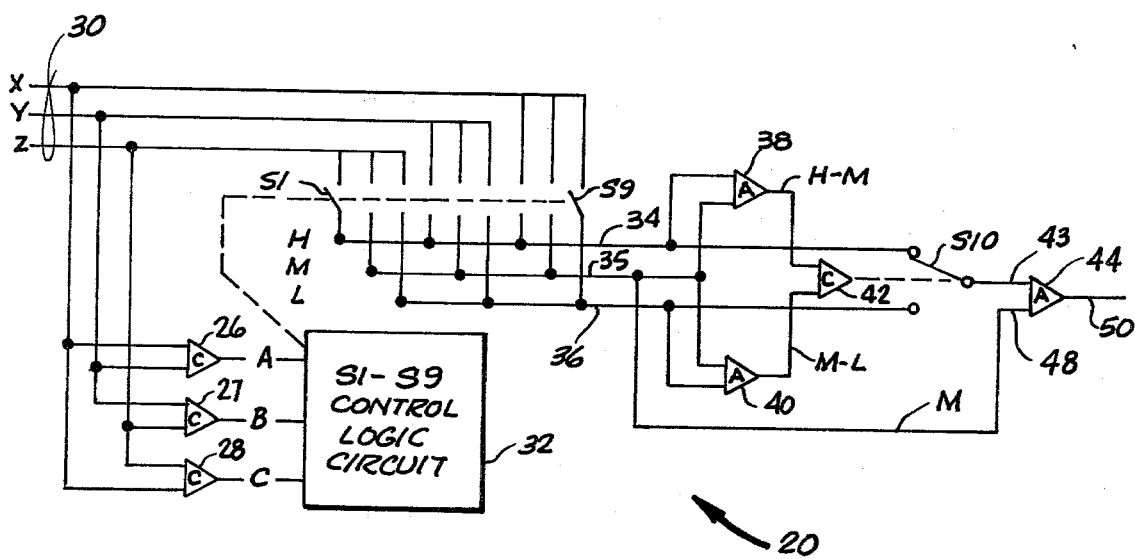
FIG. 2 is a schematic block diagram of an analog voting circuit illustrating the principles of the invention and particularly useful for system measurement and/or control of systems such as shown in FIG. 1.

The analog voting circuit 20, by means of which a single output signal may be derived in response to the three temperature signals from the sensors 16, is shown in schematic block diagram detail in FIG. 2. Continuous and possibly varying analog signals X, Y, Z are applied from the temperature sensors 18 to the circuit 20 over three lines 30. The level of the signals are compared by means of comparators 26, 27 and 28 to derive logic signals A, B, C with levels which define the relationship of the levels of signals X, Y, Z with the following meaning:

$A = X > Y,$ $B = Y > Z,$ and $C = Z > X$.

The signals A, B, C are supplied to a control logic circuit 32 which is used to selectively close a series of switches S1-S9 so that the highest, middle and lowest level signal of the signals X, Y, Z are applied to three lines 34, 35, and 36, respectively, there being three possible switch connections for application of the signals X, Y, Z from each of the lines 30 to each of the lines 34, 35 and 36. The selected closure of the switches S1-S9 as a function of the signals A, B, C for connecting H (highest), M (middle) and L (lowest) of the signals X, Y, Z to the lines 34, 35 and 36, may be tabulated in the following truth table.

| | TRUTH TABLE | |
|---|---|---|
| INPUT<br>A B C | CLOSURE OF SWITCHES<br>1 2 3 4 5 6 7 8 9 | OUTPUT<br>H M L |
| 0 0 0 | 0 0 0 0 0 0 0 0 0 | * |
| 0 0 1 | 1 0 0 0 0 0 0 0 1 | Z Y X |
| 0 1 1 | 0 1 0 1 0 0 0 0 1 | Y Z X |
| 0 1 0 | 0 0 1 1 0 0 0 1 0 | Y X Z |
| 1 1 0 | 0 0 1 0 1 0 1 0 0 | X Y Z |
| 1 1 1 | 0 0 0 0 0 0 0 0 0 | * |
| 1 0 1 | 1 0 0 0 0 1 0 1 0 | Z X Y |
| 1 0 0 | 0 1 0 0 0 1 1 0 0 | X Z Y |

[* Logical contradiction, all signals cannot simultaneously be of a higher or lower level than each other.]

In the column ABC the presence of a 1 represents the validity of the inequalities A, B or C and a 0 represents their negation. In the switch closure column, the presence of a 1 represents a closed switch and a 0 represents an open switch; and in the HML column, the letter X, Y or Z represents that the corresponding signal X, Y or Z is connected to the H, M or L lines 34, 35, or 36, through the selectively closed switches S1-S9. For example, for an ABC input condition of 101, the switches S1, S6, and S8 are closed to connect the signals Z, Y, X, respectively, to the output lines H, L, M.

The control logic circuit 32 for effecting the selective closure of the switches S1-S9 may be defined by the following switching logic equations that can be written directly from the truth table and then simplified.

| SWITCHING LOGIC EQUATIONS FOR CIRCUIT 32 | |
|---|---|
| SWITCH CLOSURE DIRECTLY WRITTEN | SIMPLIFIED |
| $S1 = A\bar{B}C + \bar{A}\bar{B}C =$ | $\bar{B}C$ |
| $S2 = A\bar{B}\bar{C} + \bar{A}BC =$ | $S6\bar{C} + S4C$ |
| $S3 = AB\bar{C} + \bar{A}B\bar{C} =$ | $B\bar{C}$ |
| $S4 = \bar{A}B\bar{C} + \bar{A}BC =$ | $\bar{A}B$ |
| $S5 = AB\bar{C} + \bar{A}\bar{B}C =$ | $S3 A + S1 \bar{A}$ |
| $S6 = A\bar{B}\bar{C} + AB\bar{C} =$ | $A\bar{B}$ |
| $S7 = AB\bar{C} + A\bar{B}\bar{C} =$ | $A\bar{C}$ |
| $S8 = \bar{A}B\bar{C} + AB\bar{C} =$ | $S4\bar{C} + S1 A$ |
| $S9 = \bar{A}BC + \bar{A}\bar{B}C =$ | $\bar{A}C$ |

The implementation of the simplified logic equations to construct the control logic circuit 32 involves a process that is very well known in the art once the equations are determined. The general principles for carrying out such a process is set forth in a publication by Mitchell P. Marcus, *Switching Circuits For Engineers*, Prentice-Hall, Inc., Englewood Cliffs, N.J., 1962, and which is incorporated herein by reference to show the state of the art.

Thus, by means of te comparators 26, 27 and 28, the control logic circuit 32 and the switches S1-S9, the signals X, Y, Z may be sorted and ranked as H, M, L signal levels on the lines 34, 35 and 36, respectively. The H and M signal levels are applied to the input of a difference amplifier 38 to obtain an output signal level proportional to H-M, while the M and L signal levels are applied to the input of a difference amplifier 40 to obtain an output signal level proportional to M-L. The H-M and M-L levels are applied to the input of a comparator 42. If H-m is smaller than M-L, then the comparator 42 operates a switch S 10 to connect the line 34 to an input 43 of an averaging amplifier 44; while if M-L is smaller than H-M, then the comparator 42 operates the switch S 10 to connect the line 36 to the input 43. A second input 48 is connected to the line 35 for both conditions H-M<M-L and M-L<H-M. The averaging amplifier 44 averages the levels applied to the inputs 43 and 48 to produce on an output lead 50 a signal level that is the average of the middle signal level and the signal level that is closest to the middle signal level.

Figure 3:
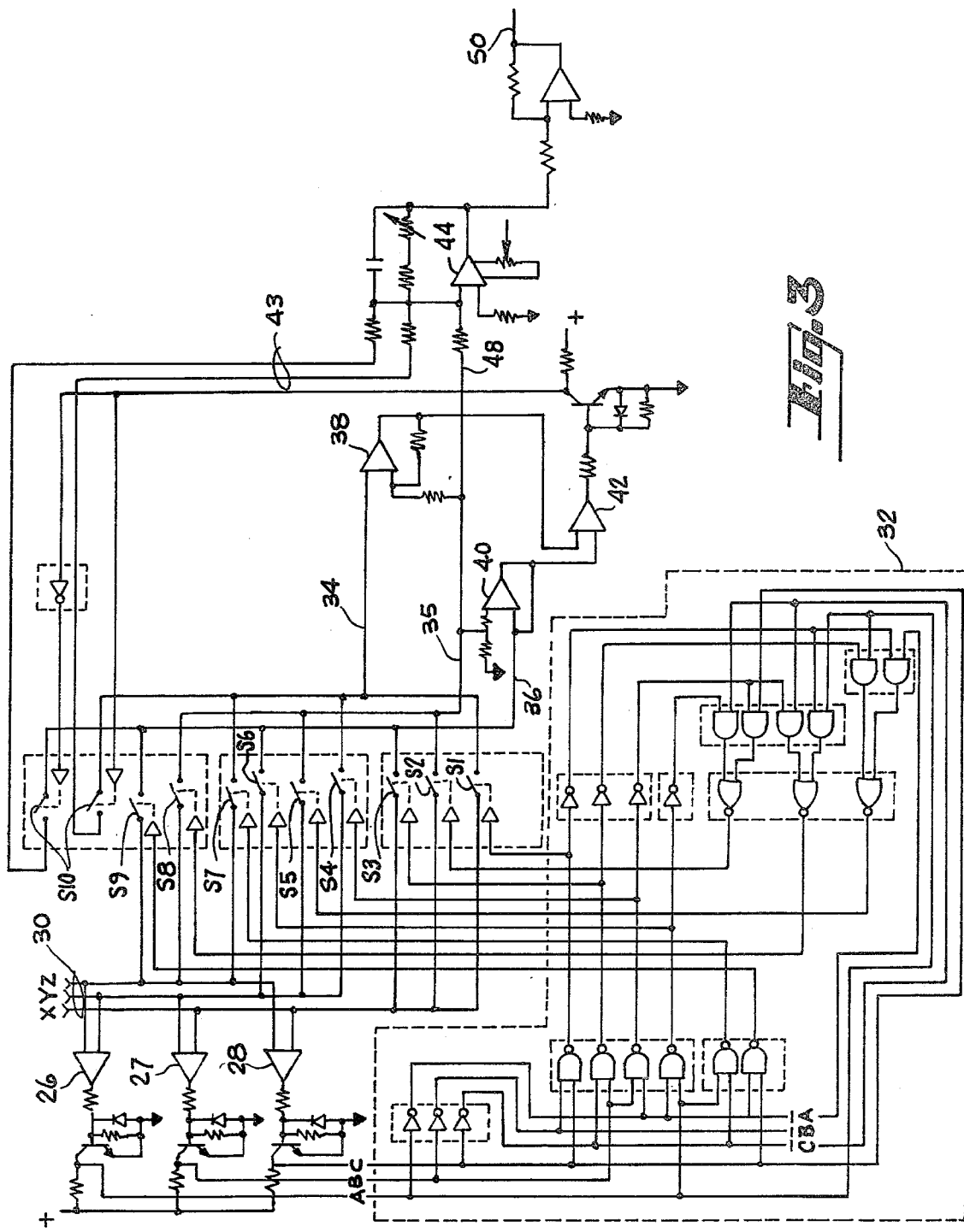
FIG. 3 is a detailed schematic diagram of the analog voting circuit of FIG. 2.

A circuit 20 to produce the foregoing result has been constructed using the principles found in the aforementioned *Switching Circuit For Engineers*. This circuit has been successfully tested and is shown in schematic detail in FIG. 3. The arrangement and operation of the circuit 20 (FIG. 3) follows from the foregoing description of the circuit 20 (FIG. 2) and the simplified switching equations presented hereinbefore.

In actual operation of the circuit 20, input signals that were variable from 0-10 volts were applied to the lines 30 and an output signal that was the average of the two input signals of closest level was compared to the measured output on lead 50. The input voltages were varied in different combinations over the input voltage range and the average of the two closest levels was found to appear accurately as the output voltage on lead 50.

While an embodiment of the invention has been shown and described, further embodiments or combinations of those described herein will be apparent to those skilled in the art without departing from the spirit of the invention. For example, the invention can be used for digital applications or in a digital embodiment for the described analog applications by using an analog-to-digital converter at the input and a digital-to-analog converter at the output; the invention could also be embodied in a mechanical configuration.

What is claimed is:

1. A signal voting method for generating a single output signal in response to three input signals, including the steps of:
   sorting said input signal by level of amplitude and determining the highest level signal, the middle level signal, and the lowest level signal;
   selecting the highest or lowest level signal closest to the middle level signal; and
   producing an output signal that is an average of said selected and middle level signals.

2. The method of claim 1, wherein said selecting step includes:
   subtracting the middle level signal from the highest level signal to produce a first difference signal;
   subtracting the lowest level signal from the middle level signal to produce a second difference signal; and
   determining the smallest of said difference signals, the smallest difference signal indicating that the highest or lowest level signal associated therewith is closest to the middle level signal.

3. The method of claim 2, wherein said plurality of input signals appear in parallel on input lines and wherein said step of sorting includes determining on which of the input lines the highest, or lowest signal level appears for said steps of subtraction, selection and averaging.

4. The method of claim 1, wherein said input signals are derived from a plurality of temperature sensing devices.

5. The method of claim 4, for use with a solar receiver panel that includes a water input for receiving a flow of water and a steam output manifold for passing steam from the panel, and wherein the temperature sensed is in the steam outlet manifold of the panel, and the output signal is used to control the water flow into the panel.

6. A signal voter for performing the signal voting method of claim 1 for generating a single output signal in response to a plurality of input signals, including:
   a source of input signals;
   means for sorting said input signals by level of amplitude and determining the highest level signal, the middle level signal and the lowest level signal;
   means for selecting the highest or lowest level signal closest to the middle level signal; and
   averaging means responsive to said selected signal level and said middle signal level to produce an output signal that is an average of said selected and middle level signals.

7. The signal voter of claim 6, wherein said selecting means includes:
   means for subtracting the middle level signal from the highest level signal to produce a first difference signal;
   means for subtracting the lowest level signal from the middle level signal to produce a second difference signal, and
   means for determining the smallest of said difference signals, the smallest difference signal indicating that the highest or lowest level signal associated therewith is closest to the middle level signal to provide said selected signal level for averaging with said middle level signal.

8. The signal voter of claim 7, wherein said sorting means includes highest, middle and lowest level signal lines, and said sorting means is operable in response to said input signals to connect the input lines on which the highest, middle and lowest level signals appear to the highest, middle and lowest level signal lines, respectively, for application to said two subtracting means and said averaging means.

9. The signal voter of claim 6, wherein said source produces analog input signals in parallel and includes a plurality of input lines on each of which lines appears one of said plurality of input signals.

10. The signal voter of claim 9, wherein said plurality of input lines consists of three lines.

11. The signal voter of claim 6, wherein said source of input signals includes a plurality of temperature sensing devices.

12. The signal voter of claim 11, further including a solar receiver panel that comprises a water input for receiving a flow of water and a steam output manifold for passing steam from the panel, and wherein said sensing devices are located in the steam outlet manifold of the panel, and said output signal is used to control the water flow into the panel.

* * * * *